(12) United States Patent
Hatta et al.

(10) Patent No.: US 9,566,859 B2
(45) Date of Patent: Feb. 14, 2017

(54) BATTERY TEMPERATURE CONTROL DEVICE

(71) Applicant: Nissan Motor Co., Ltd., Yokohama-shi, Kanagawa (JP)

(72) Inventors: Kentaro Hatta, Kawasaki (JP); Kentaro Oshima, Atsugi (JP); Qiye Yang, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/435,276

(22) PCT Filed: Oct. 21, 2013

(86) PCT No.: PCT/JP2013/078455
§ 371 (c)(1),
(2) Date: Apr. 13, 2015

(87) PCT Pub. No.: WO2014/069270
PCT Pub. Date: May 8, 2014

(65) Prior Publication Data
US 2015/0291019 A1    Oct. 15, 2015

(30) Foreign Application Priority Data
Nov. 5, 2012    (JP) .................. 2012-243400

(51) Int. Cl.
*B60K 11/06*    (2006.01)
*B60L 3/00*    (2006.01)
(Continued)

(52) U.S. Cl.
CPC ........... *B60K 11/06* (2013.01); *B60H 1/00278* (2013.01); *B60H 1/32* (2013.01); *B60K 1/04* (2013.01);
(Continued)

(58) Field of Classification Search
CPC ... B60K 11/06; B60K 1/04; B60K 2001/0438; B60L 11/1874; B60L 11/1875; H01M 10/613; H01M 10/615; H01M 10/625; H01M 10/663
(Continued)

(56) References Cited

U.S. PATENT DOCUMENTS 4,232,214 A * 11/1980 Shioi .................... H01C 1/1406
219/541
5,390,754 A * 2/1995 Masuyama .............. B60K 1/04
105/51
(Continued)

FOREIGN PATENT DOCUMENTS

| CN | 101386285 A | 3/2009 |
|---|---|---|
| EP | 2 712 005 A1 | 3/2014 |

(Continued)

*Primary Examiner* — Frank Vanaman
(74) *Attorney, Agent, or Firm* — Global IP Counselors, LLP

(57) ABSTRACT

A battery temperature control device has a battery pack case that houses a temperature control unit and a battery stack as a group of battery modules. The temperature control unit has an evaporator exchanges heat using the air conditioning unit from the upstream side of the direction of airflow, a blower fan that recirculates the interior air inside the pack case, a PTC heater as a fin member, and a unit duct that supplies air to the battery stack.

4 Claims, 6 Drawing Sheets

(51) Int. Cl.

| | | |
|---|---|---|
| *B60L 11/18* | (2006.01) | |
| *B60H 1/32* | (2006.01) | |
| *B60H 1/00* | (2006.01) | |
| *H01M 10/625* | (2014.01) | |
| *H01M 10/6563* | (2014.01) | |
| *H01M 10/6551* | (2014.01) | |
| *H01M 10/613* | (2014.01) | |
| *H01M 10/663* | (2014.01) | |
| *H01M 10/615* | (2014.01) | |
| *H01M 10/6571* | (2014.01) | |
| *H01M 10/6565* | (2014.01) | |
| *B60K 1/04* | (2006.01) | |
| *H01M 2/10* | (2006.01) | |
| *H01M 10/647* | (2014.01) | |
| *B60K 1/00* | (2006.01) | |

(52) U.S. Cl.
CPC .................. *B60L 3/00* (2013.01); *B60L 11/18* (2013.01); *B60L 11/1874* (2013.01); *H01M 10/613* (2015.04); *H01M 10/615* (2015.04); *H01M 10/625* (2015.04); *H01M 10/6551* (2015.04); *H01M 10/6563* (2015.04); *H01M 10/6565* (2015.04); *H01M 10/6571* (2015.04); *H01M 10/663* (2015.04); *B60H 2001/003* (2013.01); *B60K 2001/005* (2013.01); *B60K 2001/008* (2013.01); *B60K 2001/0438* (2013.01); *H01M 2/1077* (2013.01); *H01M 10/647* (2015.04); *H01M 2220/20* (2013.01)

(58) Field of Classification Search
USPC ........................................................ 180/68.5
See application file for complete search history.

(56) References Cited

U.S. PATENT DOCUMENTS

| | | | |
|---|---|---|---|
| 5,490,572 A * | 2/1996 | Tajiri ................. | B60H 1/00278 180/65.1 |
| 5,937,664 A * | 8/1999 | Matsuno ............ | B60H 1/00278 62/186 |
| 7,384,704 B2 * | 6/2008 | Scott .................. | B60H 1/00278 136/204 |
| 2005/0011692 A1* | 1/2005 | Takahashi ............... | B60R 16/04 180/68.5 |
| 2009/0071178 A1* | 3/2009 | Major ................. | B60H 1/00278 62/239 |
| 2012/0148889 A1* | 6/2012 | Fuhr ................... | H01M 2/1077 429/87 |

FOREIGN PATENT DOCUMENTS

| | | |
|---|---|---|
| FR | 2 865 070 A1 | 7/2005 |
| JP | 2002-313441 A | 10/2002 |
| JP | 2008-54379 A | 3/2008 |
| JP | 2011-41357 A | 2/2011 |
| JP | 2011-116321 A | 6/2011 |
| JP | 2011-134615 A | 7/2011 |
| JP | 2012-23141 A | 2/2012 |

* cited by examiner

BATTERY TEMPERATURE CONTROL DEVICE

CROSS-REFERENCE TO RELATED APPLICATIONS

This application is a U.S. National stage application of International Application No. PCT/JP2013/078455, filed Oct. 21, 2013, which claims priority to JP Patent Application No. 2012-243400 filed on Nov. 5, 2012, the contents of each of which are hereby incorporated herein by reference.

BACKGROUND

Field of the Invention

The present invention relates to a battery temperature control device for battery modules housed in a battery pack case.

Background Information

Conventionally, a vehicle battery cooling system is known which discloses a structure in which, in order to drain the condensed water or condensate generated in the evaporator is tilted and a drainage is provided (for example, see Japanese Patent Application Publication No. 2008-54379 A).

SUMMARY

However, in the conventional battery cooling system, when a drainage is provided, foreign objects such as water, dust, mud, and the like are received by the waste water drain which can reach a battery electrode, causing the problem of short circuiting electrodes. In order to cope with this problem, the drainage can be remove. When the drainage is removed, condensed water generated by the evaporator can reach the electrodes.

The present invention, which has been made in view of the above problem, has an object to provide a battery temperature control device which can prevent the condensed water generated in the evaporator of the temperature control unit from reaching the electrodes of the battery modules.

In order to achieve the above object, the battery temperature control device according to the present invention comprises a battery module, a temperature control unit for adjusting or controlling the temperature of the battery module, and a battery pack case that houses the battery module and the temperature control unit. The temperature control unit includes, respectively arranged from upstream of the direction of air flow, an evaporator for exchanging heat using a refrigerant of a vehicle interior air conditioner, a blower for circulating the air in the pack case, a fin member, and a duct for sending the air to the battery module.

Thus, in the case where condensed water is generated in the evaporator, since the blower and the fin member are arranged in a position downstream of the evaporator, the condensed water of fine particulates sent from the evaporator will be blocked by attaching the blower and the fin member for evaporation. Also, due to the provision of the blower, fin member, and the duct in the downstream of the evaporator, since the distance from the evaporator to the battery electrode can be secured, the condensed water will have difficulty in reaching the battery electrode.

In other words, in addition to the condensed water blocking operation, electrode attachment can be delayed, so that the condensed water will not have a chance to reach the battery module.

Consequently, the condensed water generated at the evaporator of the temperature control unit can be prevented from reaching the battery electrode.

BRIEF DESCRIPTION OF THE DRAWINGS

Referring now to the attached drawings which form a part of this original disclosure.

DETAILED DESCRIPTION OF EMBODIMENTS

Figure 1:
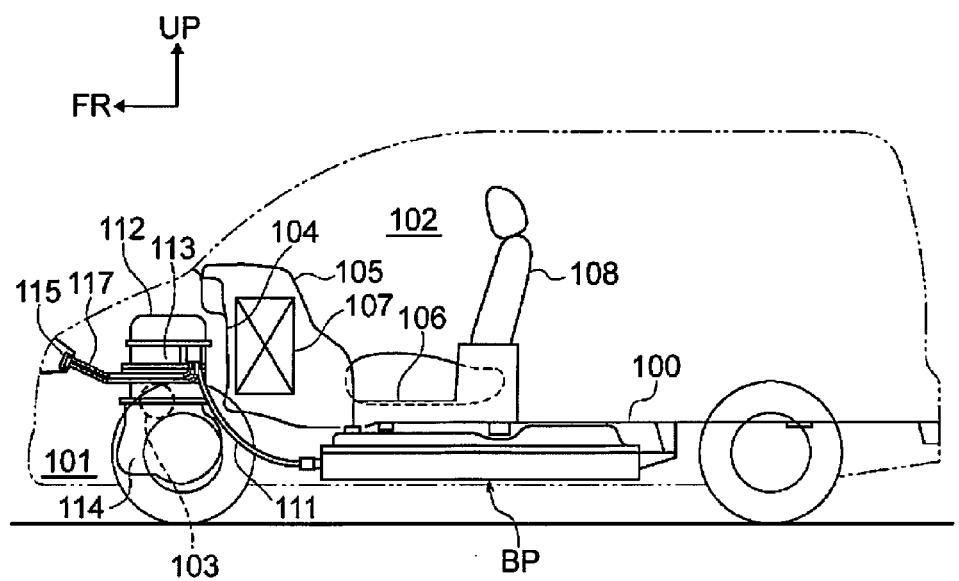
FIG. 1 is a schematic side view illustrating an electric vehicle on which a battery pack BP is mounted to which a battery temperature control device of the first embodiment is applied.

The best mode for realizing a battery temperature control device according to the present invention is now described below with reference to the first embodiment shown in the drawings.

First Embodiment

First, a description is given of the configuration.

The structure of the battery temperature control device is separately described in "VEHICLE MOUNTING STRUCTURE OF BATTERY PACK BP", "OVERALL DETAILED STRUCTURE OF BATTERY PACK BP", "REGION-PARTITIONING CONFIGURATION FOR CASE INTERNAL SPACE", and "DETAILED STRUCTURE OF BATTERY TEMPERATURE CONTROL DEVICE", respectively.

Vehicle Mounting Structure of Battery Pack BP

Figure 2:
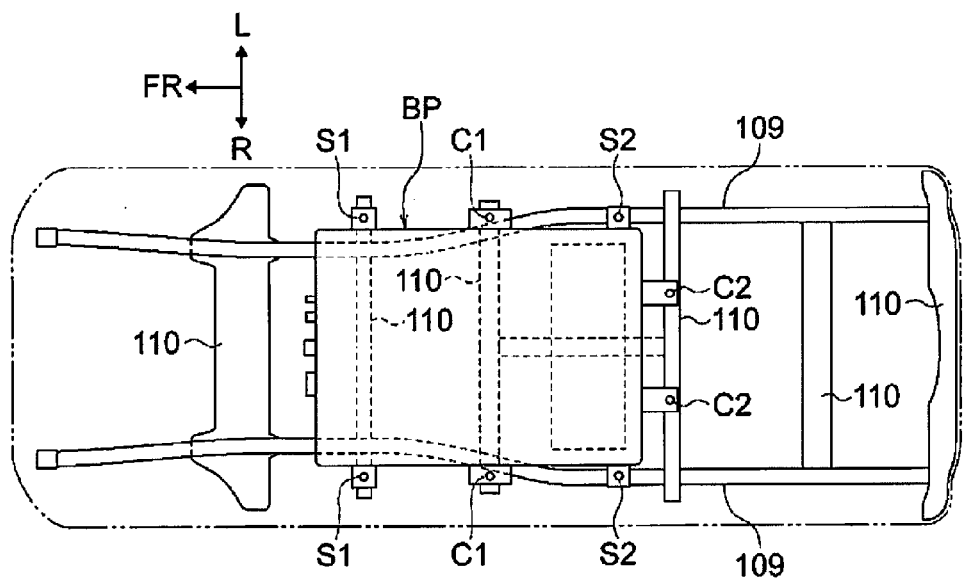
FIG. 2 is a schematic bottom view illustrating the same electric vehicle, on which the battery pack BP is mounted to which the battery temperature control device of the first embodiment is applied.

FIGS. 1 and 2 illustrate an electric vehicle on which a battery pack BP adopting a battery temperature control device in a first embodiment. Below, with reference to FIGS. 1 and 2, a description is given of the structure of the vehicle battery pack BP.

As shown in FIG. 1, the battery pack BP is placed under a floor panel 100 somewhere in the middle of the wheelbase. The floor panel 100 is structured to extend from a position connected to a dash panel 104, by which a motor room 101 and a vehicle passenger compartment 102 are separated, to a position of the rear end of the vehicle. The floor panel is formed into a flat shape across its entire length from the vehicle front to the vehicle rear. The passenger compartment 102 includes an instrument panel 105, a center console box 106, an air conditioning unit 107 and an occupant seat 108. Note that, in the motor room 101 at the vehicle front part, an air compressor 103 103 is placed, which serves to compress refrigerant used in the air conditioning unit 107.

As shown in FIG. 2, the battery pack BP is supported at eight points with respect to a body member serving as a vehicle-body strengthening member. The body member is constructed by a pair of side members 109, 109 extending in the fore-and-aft direction or longitudinal direction of the vehicle, and a plurality of cross members 110, 110 by which the pair of the side members are connected to each other in the vehicle width direction. Both sides of battery pack BP are supported at six points, i.e. by a pair of first side member support points S1, S1, a pair of first cross member support points C1, C1, and a pair of second side member support points S2, S2, respectively. The rear end of battery pack BP is supported at two points by a pair of second cross member support points C2, C2.

Returning to FIG. 1, the battery pack BP is connected to an heavy-electric module or a high power module 112 (DC/DC converter+battery charger) located in the motor room 101 via a charging/discharging harness 111 wired along the dash panel 104 in the fore-and-aft direction of the vehicle. In addition to the heavy-electric module 112, an inverter 113 and a motor drive unit 114 (drive motor for running or propulsion+reduction gear+differential gear) are also provided in the motor room 101. A charging port 115 (for quick/normal charge) having a charging-port lid is provided. The charging port 115 is connected to the high power module 112 through the charging harness 117.

The battery pack BP is connected via a bidirectional communication line such as a CAN cable (not shown) to the external electronic control system. The battery pack BP is further connected to a vehicle air conditioning system with air conditioning unit 107 disposed on the instrument panel 105. More specifically, in addition to a battery discharge control (driving control) and battery charge control (quick charge control, normal charge control. regenerative control), and the like, an internal temperature (battery temperature) of the battery pack BP is controlled by a temperature-adjusted air (cooling air, warm air).

Overall Detailed Structure of Battery Pack BP

Figure 3:
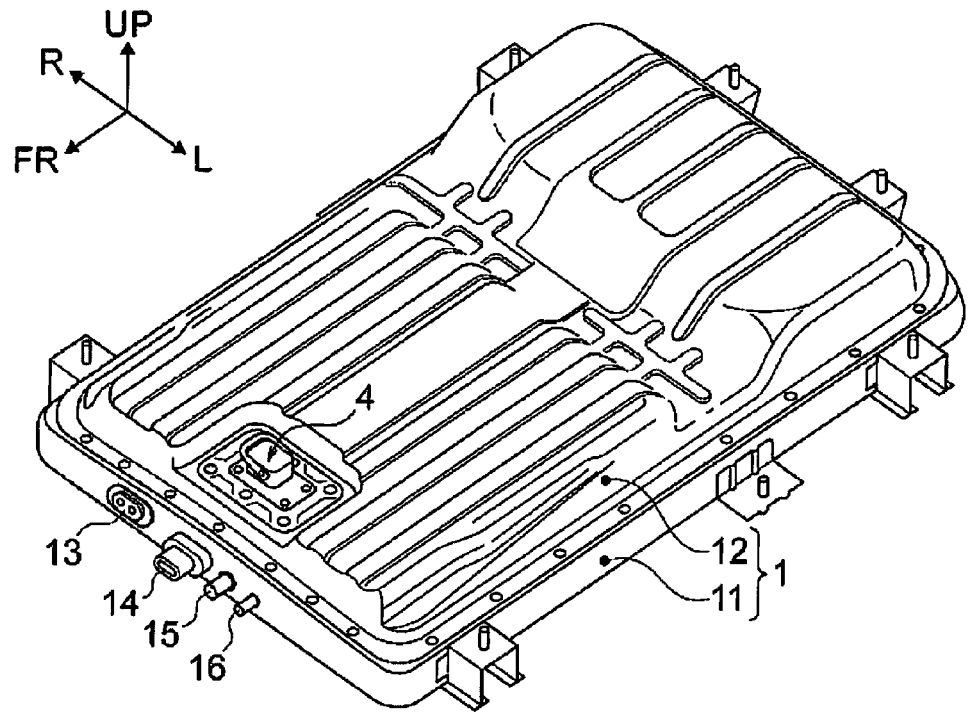
FIG. 3 is a whole perspective view illustrating the battery pack BP adopting the battery temperature control device of the first embodiment.
Figure 4:
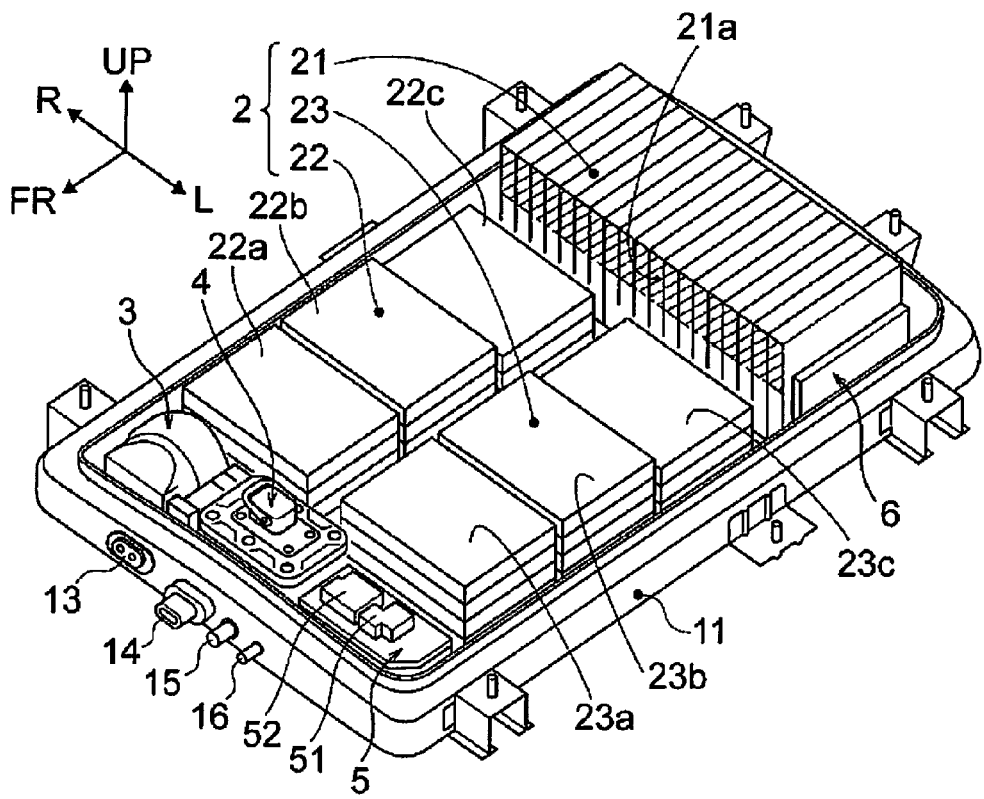
FIG. 4 is a perspective view illustrating the battery pack BP adopting the battery temperature control device of the first embodiment with a battery-case upper cover being removed.

FIGS. 3 and 4 illustrate an overall detailed structure of the battery pack BP adopting the battery temperature control device in the first embodiment. Below, with reference to FIGS. 3 and 4, description is given of the overall detailed structure of the battery pack BP.

As shown in FIGS. 3 and 4, the battery BP in the first embodiment includes a battery pack case 1, a battery stack 2, a temperature control unit 3, a service disconnect switch 4 (high voltage isolating switch or switch disconnector: hereinafter, referred to as "SD switch"), a junction box 5, and a Li-Ion battery controller 6 (hereinafter referred to as "LB Controller").

As shown in FIGS. 3 and 4, the battery pack case 1 is composed of two components, i.e., a battery pack lower frame 11 and a battery pack upper cover 12. By bolt fastening the two components with a continuous, annular seal member interposed along the outer periphery of the battery pack lower frame 11 and the battery pack upper cover 12, a watertight structure is formed so as to prevent water intrusion from the outside.

As shown in FIG. 4, the battery pack lower frame 11 is a frame member fixedly supported to the vehicle body member. This battery pack lower frame 11 is formed with a rectangular recess or space for mounting the battery stack 2 and the other pack constituting elements 3, 4, 5, 6. A refrigerant pipe connector terminal 13, a charge/discharge connector terminal 14, a heavy-electric connector terminal 15 (for passenger compartment air-conditioning), and a weak electric connector terminal 16 are attached to the frame front edge of the battery pack lower frame 11.

As shown in FIG. 3, the battery pack upper cover 12 is structured into a cover member bolted onto the outer periphery of the battery pack lower frame 11 in a watertight condition. The battery pack upper cover 12 has, in particular, a concavo-convex stepped cover contour surface in conformity with the concavo-convex height shapes of the battery stack 2.

As shown in FIG. 4, the battery stack 2 (=a group of battery modules) is mounted on the battery pack lower frame 11. The battery stack 2 is formed by three divided or individual stacks, i.e., a first battery stack 21, a second battery stack 22, and a third battery stack 23. Each of the battery stacks 21, 22, and 23 is a laminated or stacked structure in which a plurality of battery modules (=battery unit) are stacked on one another. Each module in turn is composed of second batteries (for example, lithium ion battery).

The detailed structure of each battery stack 21, 22, and 23 is described below.

As shown in FIG. 4, the first battery stack 21 is mounted in a vehicle rear region of the battery pack lower frame 11. The first battery stack 21 is prepared by a plurality of battery modules stacked on one another in the thickness direction thereof, using a rectangular shaped battery module of flat and thin in thickness module as an element. Then, the stack is formed by vertically stacking or piling up the battery modules in the same direction as the vehicle width direction (such as 20 sheets stacked vertically).

As shown in FIG. 4, the second battery stack 22 and the third battery stack 23 are installed separately from each other respectively, and on the left and the right along the vehicle width direction in the vehicle central region forward of the first battery module 21. The second battery stack 22 and the third battery stack 23 are of a flat-stacked configuration of exactly the same pattern. More specifically, a battery module of rectangular shape having a thickness that is relatively thin is prepared as a constituting element, and a plurality (such as 4 or five sheets) of these battery modules are stacked in the thickness direction. Further a plurality of sets of such stacked battery modules (for example, one set of four sheets of stacked battery modules and two sets of five sheets of stacked modules) are prepared. These sets of stacked battery modules are prepared in a flat-stacked state in which the staking direction of the battery modules and the vehicle vertical direction are the same. Finally, the second battery stack is formed by placing a plurality of these flat-stacked modules in the vehicle longitudinal direction, for example, by arranging the four flat-stacked modules, the five flat-stacked modules, and the five stacked modules in the order in the direction from the vehicle rear to the vehicle front. As shown in FIG. 4, the second battery stack 22 has front-side battery stack portions 22a, 22b and rear-side battery stack portions 22c which is lower than the front-side battery stack portions 22a, 22b by a single sheet. The third battery stack 23 has, as shown in FIG. 4, front-side battery stack portions 23a, 23b and rear-side battery stack portion 23c which is lower than the front-side battery stack portions 23a, 23b by a single sheet.

As shown in FIG. 4, the temperature control unit 3 is disposed on the right side region of the vehicle front space of the battery pack lower frame 11, and temperature controlled air (cooling air, warm air) is blown into an air distribution duct 9 of the battery pack BP as described below.

As shown in FIGS. 3 and 4, the SD switch 4 is located in a central region of the vehicle forward space of the battery lower frame 11 for mechanically turning off the battery heavy-electric circuit through manual operation. The battery heavy-electric circuit or power circuit is formed by connecting each battery stack 21, 22, and 23 containing an internal bus-bar, a junction box 5, and the SD switch 4 each other through bus-bar. When inspecting, repairing, and replacing components such as the heavy-electric module 112, the inverter 113, and the like, the switching between OFF and OFF states of the SD switch 4 can be changed by manual operation.

As shown in FIGS. 3 and 4, the junction box 5 is arranged in the left side region of the vehicle front space of the battery pack lower frame 11 to perform a centralized supply/shutoff/ distribution of high voltage by a relay circuit. This junction box 5 also includes a temperature control relay 51 and a temperature controller 52 for controlling the temperature control unit 3. The junction box 5 is connected to an external heavy-electric module 112 via a charge/discharge connector terminal 14 and a charge and discharge harness 111. The junction box 5 is connected to an external electronic control system via the weak electric harness.

As shown in FIG. 4, the LB controller 6 is disposed on the left side end surface position of the first battery stack 21 to perform capacity management, temperature management, and voltage management of each battery stack 21, 22, 23. This LB controller 6 acquires battery capacity information, battery temperature information, and battery voltage information through arithmetic processing based on a temperature detection signal of a temperature detection signal line, a battery voltage detection value from the battery voltage signal detection line, and a battery current detection signal of the battery current detection signal line. Further, the LB controller 6 is connected to the external electronic control system through the weak electric harness transmitting an ON/OFF signal of the relay circuit, battery capacity information, battery temperature information, and the like.

Region-Partitioning Configuration of Pack Case Inner Space

Figure 5:
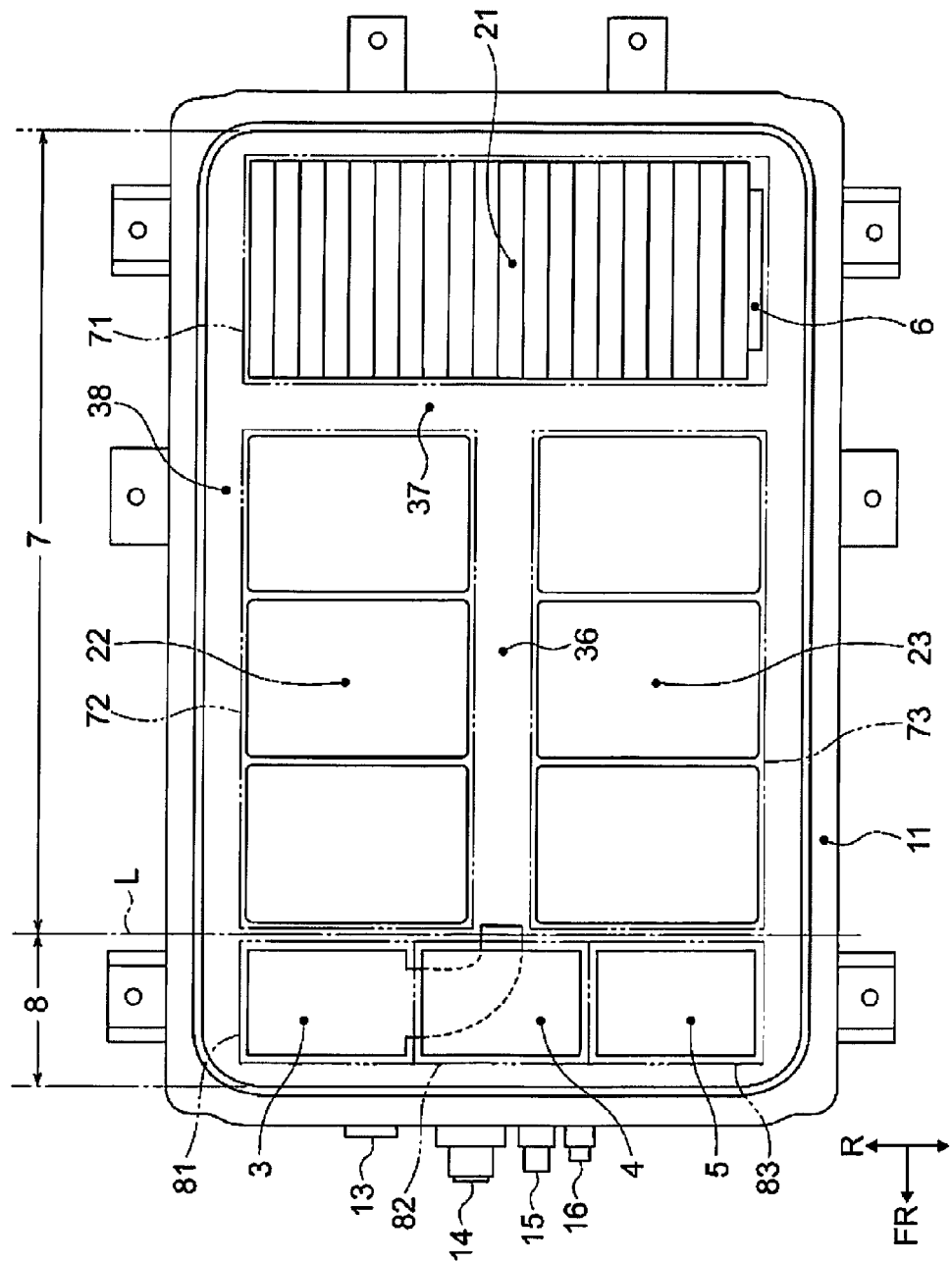
FIG. 5 is a plan view illustrating the region-partitioning configuration of the case internal space of the battery pack BP adopting the battery temperature control device of the first embodiment.

FIG. 5 is a region-partitioning configuration of the case internal space of the battery pack BP adopting the battery temperature control device in the first embodiment. Below, description is given of the region-partitioning configuration of the pack case internal space with reference to FIG. 5.

As shown in FIG. 5, in the battery pack BP in the first embodiment, the inner space of the battery pack case 1 is partitioned or divided by a boundary line L drawn across the vehicle width direction into two regions in the vehicle longitudinal direction, i.e., a battery module accommodating or mounting region 7 on the vehicle rear side and an electrical equipment or component accommodating or mounting region 8 on the vehicle front side. The battery module mounting region 7 occupies the larger region extending between the vehicle rear-end and the boundary line L forward of the vehicle. The electrical equipment mounting region 8 occupies a region extending between a vehicle frontend and the boundary line L on the vehicle front side, the electrical equipment mounting region 8 being a narrower region than the battery module mounting region 7.

The battery module mounting region 7 is divided into three split rectangular regions, namely, a first split rectangular region 71, a second split rectangular region 72, and a third split rectangular region 73 by a T-shaped passage (formed by a central passage 36 and an intersecting passage 37). The first battery stack 21, which has the LB controller 6 attached to one side surface thereof, is mounted in the first split rectangular region 71. The second battery stack 22 is mounted in the second split rectangular region 72. The third battery stack 23 is mounted in the third split rectangular region 73.

The electrical equipment mounting region 8 is divided into three regions, i.e., a first partitioning region 81, a second portioning region, and a third partitioning region 83. The temperature control unit 3 is mounted in a region extending between the first partitioning regions 81 and the lower part of the second portioning region. The SD switch 50 is mounted on the upper part of the second partitioning region 82. The junction box 5 is mounted in the third partitioning region 83.

In the battery module mounting space 7 of the battery pack BP, a space for arranging the air distribution duct 9 (see FIGS. 6 and 9) is secured, and, for an internal circulation of conditioned or temperature controlled air, a temperature control air passage is formed. The temperature controlled air passage is formed by using the gap created by mounting each battery stack 21, 22, and 23 in the respective partitioning region. The temperature control air passage includes a central passage 36 in the vehicle longitudinal direction (second passage), a cross passage 37 in the vehicle width direction crossing the central passage 36, and a recirculation passage 38 for returning the introduced temperature controlled air back to the temperature control unit 3. The central passage 36 is formed by leaving a gap between the opposing surfaces of the second battery stack 22 and the third battery stack 23. The cross passage 37 is formed by leaving a gap between opposing surfaces of the first battery stack 21 and the second and third battery stacks 22, 23. The recirculation passage 38 is formed by giving a clearance allowance or gap between the battery pack lower frame 11 and each pack constituting component 2, 3, 4, 5, and 6. Note that, as the temperature control air passage, other than the central passage 36, the cross passage 37, and the recirculation passage 38, such a gap or clearance are also included, which are formed by mounting in the case inner space the pack constituting components 2, 3, 4, 5, and 6.

Temperature Control Structure of Battery Pack BP

FIGS. 6 to 9 are diagrams showing the details of the temperature control device of the first embodiment, which is mounted on the battery pack BP. Below, with reference to FIGS. 6 to 9, the temperature control device is now detailed.

Figure 6:
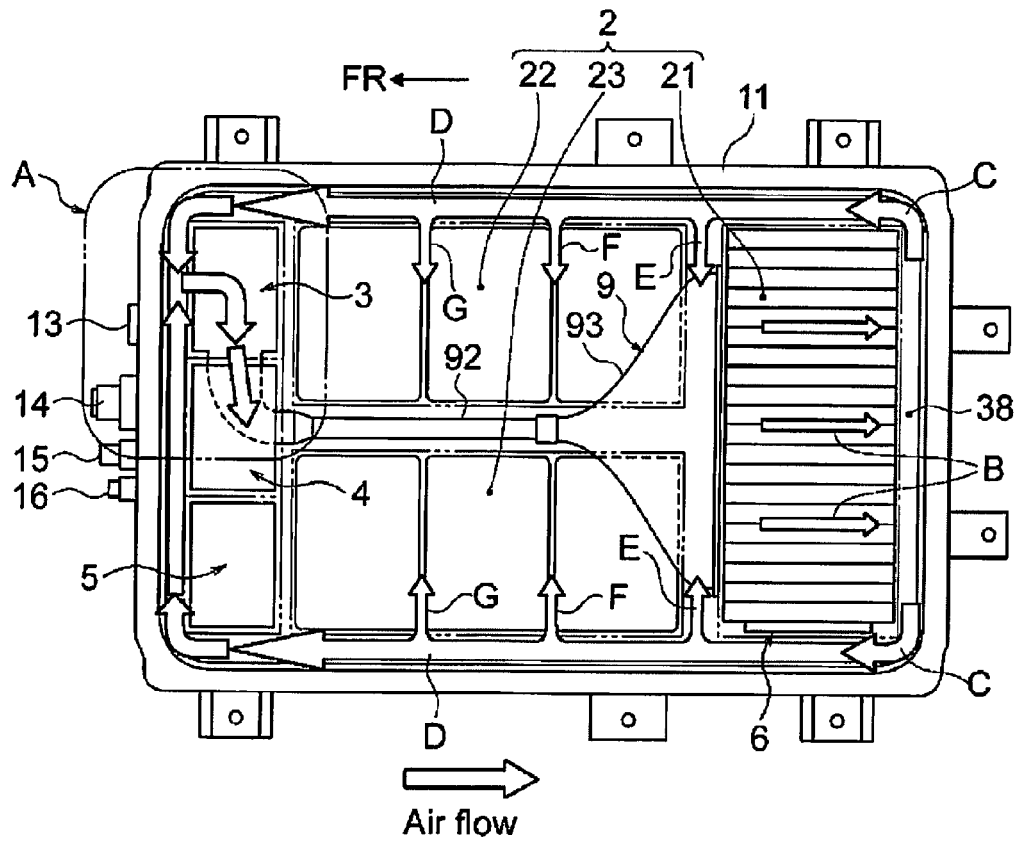
FIG. 6 is a plan view illustrating the internal structure of the battery pack BP adopting the battery temperature control device in the first embodiment and the flow of temperature controlled or adjusted air with the battery-case upper cover removed.

As shown in FIG. 6, the battery temperature control device includes a first battery stack 21, a second battery stack 22, a third battery stack 23, a temperature control unit 3, and an air distribution duct 9.

The first battery module 21 is disposed for accommodation in the vehicle rearward region of the internal space of the battery pack case 1. The second and third battery stacks 22, 23 are disposed for accommodation in the inner space of the battery pack case 1 and arranged in the region forward of the first battery stack 21 and the height of the stacks are dimensioned lower that of the first battery stack 21.

Figure 7:
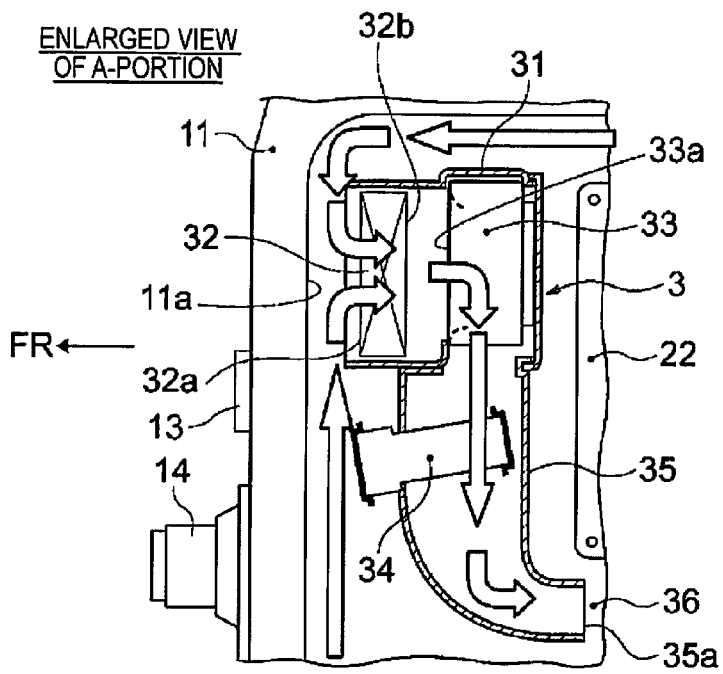
FIG. 7 shows a temperature control situation in the vicinity of the temperature control unit and an enlarged view of the A-portion of FIG. 6, showing the flow of the temperature controlled air.

As shown in FIG. 7, the air temperature control unit 3 has an evaporator 32 within a unit case 31 in the direction from the upstream of the air flow, a blowing fan 33 (blower), and a PTC heater 34 (fin member). The air temperature control unit 3 is disposed in the inner space of the battery pack case 1 which is placed in the underfloor position in the middle of the vehicle longitudinal direction and is arranged in a position on the side near an air compressor 103 disposed in the motor room 101 forward of the vehicle.

The unit case 31 is disposed in a first partitioned region 81 of the corner section within the electrical equipment mounting region 8. The discharge or blowing port of the unit case is connected to a unit duct 35. The unit duct is formed in an L-shape bent from the vehicle width direction into the vehicle longitudinal direction and includes an air distribution port 35a connected with the air distribution duct 9 in an end position exposed to the central passage 36.

The evaporator 32 exchanges heat with the refrigerant of the air conditioning unit 107 (vehicle cabin air conditioner) and produces a cooling air by removing heat from the pass-through air. The refrigerant from the air conditioning unit 107 is introduced into the evaporator 32 via a refrigerant pipe connector terminal 13. As shown in FIG. 7, the evaporator 32 is disposed forward of the blower fan 33 in the front of the vehicle, and arranged with one of its core surfaces 32a to oppose and parallel to a frame inner side surface 11a (pack case inner side) in the vehicle front position.

The blower fan 33 is intended to circulate the air within the pack case and includes a waterproof structure that isolates the blower motor from water. The blower fan 33, as shown in FIG. 7, is disposed with its suction side 33a (=intake side) generally opposed and parallel to the other side 32b of the core surfaces of the evaporator 32.

Figure 8:
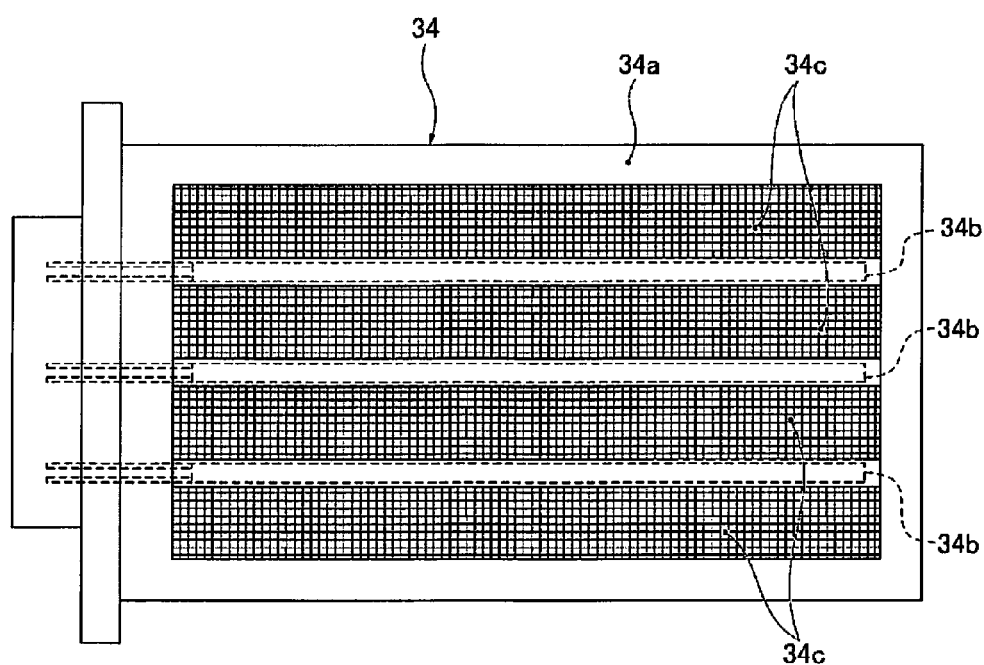
FIG. 8 is a diagram illustrating an example of a PTC heater of the temperature control unit mounted in the battery pack BP adopting the battery temperature control device of the first embodiment.

The PTC heater 34 uses a ceramic element (PTC element) called as a PTC thermistor (Positive Temperature Coefficient Thermistor), and generates heat when current flows through the PTC element to produce warm air by applying heat to the air passing through. The PTC heater 34 is a fin type PTC heater including radiating fins for increasing the heating value of the PTC element. For example, as shown in FIG. 8, a heater frame 34a, a PTC element 34b, and mesh fins 34c are included.

As shown in FIG. 6, the air distribution duct 9 is connected at its one end with the air distribution port 35a of the unit duct 35 and is provided, at the other end, with an air blowout opening 91 that blows out a temperature controlled air to the vehicle rear via a constant width duct portion 92 and a width widening duct portion 93 disposed in the T-shaped clearance space.

The blowout opening 91 extends along a stack front surface upper region 21a (see FIG. 4) of the first battery stack 21, which protrudes vehicle upward form the upper surfaces of the second and third battery stacks 22, 23.

Figure 9:
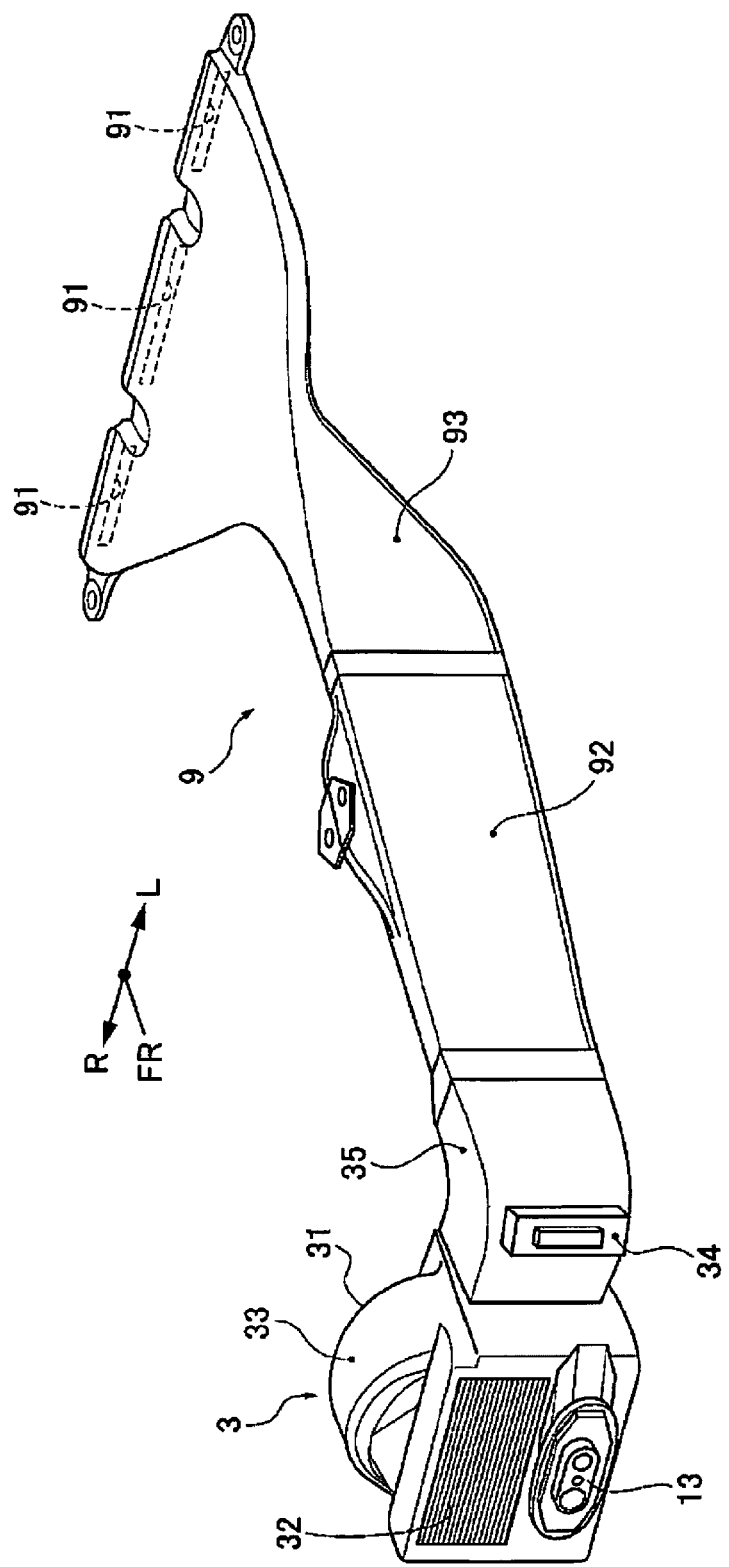
FIG. 9 is a perspective view illustrating the temperature control unit and an air distribution duct mounted on the battery pack BP adopting the battery temperature control device in the first embodiment.

The constant width duct portion 92 is connected to the air distribution port 35a of the unit duct 35, and, as shown in FIG. 9, includes an elongated cross section with a constant side in the vehicle width direction and extends in the vehicle longitudinal direction. The clearance created by the central passage 36 of the T-shaped clearance space similar in shape to the duct cross section is used for placement of the constant width duct portion 92.

As shown in FIG. 9, the width widening duct portion 93 is connected with the constant width duct portion 92, and is shaped such that the vertical dimension of the duct cross section is gradually decreased in the direction of the blowout opening 91 while the width of the duct cross section is gradually widening toward the blowout opening 91. Further, for the arrangement of the widening width duct portion 9, the central passage 36 of the T-shaped clearance space, a clearance space created upward of the rear side battery stack portions 22c, 23c, the height of which are lower than the front side battery stack portions 22a, 22b by one sheet, and an upward space of the cross passage 37 upward of the T-shaped clearance are taken advantage of.

Now, the operation is described. The operations of the battery temperature control device in the first embodiment are separately described in "BATTERY TEMPERATURE CONTROL OPERATION OF BATTERY PACK BP", and "SHORT CIRCUIT PREVENTION OPERATION OF ELECTRODE DUE TO CONDENSED WATER".

Battery Temperature Control Operation of Battery Pack BP

The battery is highly temperature dependent so that the battery performance is reduced when the battery temperature is either too high or low. Thus, in order for the battery performance to maintain at low or high outside temperature, it is preferable to maintain the battery temperature in an optimum temperature range. Below, with reference to FIGS. 6, and 7, description is given of the battery temperature control operation reflecting this consideration.

First, a temperature control operation, performed by the LB controller 6 is discussed. For example, when the internal temperature of battery pack BP exceeds a first set temperature due to continuous battery charging/discharging loads and/or high outside air temperatures, refrigerant is introduced into the evaporator 32 of temperature control unit 3, and the blower fan 33 is rotated. Thus, heat is removed from the air passing through the evaporator 32 and thus cooling air is created, as shown in FIG. 7. By circulation of the cooling air in the case internal space, in which the first battery stack 21, the second battery stack 22, and the third battery stack 33 are mounted, the internal temperature (=battery temperature) in the battery pack BP can be reduced.

In contrast, when the internal temperature of battery pack BP is less than a second predetermined temperature due to cooling air circulation and/or low outside air temperatures, the PTC heater 34 of the temperature control unit 3 is energized, and the blower fan 33 is rotated. Thus, as shown in FIG. 7, heat is added to the air passing through the PTC heater 34, and thus warm air is created. By circulation of the warm air in the case internal space, in which the first battery pack 21, the secondary pack 22, and the third battery stack 23 are respectively mounted, the internal temperature of the battery pack BP (=battery temperature) increases.

Thus, by performing the temperature control of the battery pack BP, it is possible for the internal temperature of the battery pack BP to be maintained within the range between the first predetermined temperature and the second predetermined temperature. At this time, it is critical to circulate the temperature controlled air while discharging so that the temperature distribution of the first to third battery packs 21, 22, 23 will be uniform. Below, description of the battery temperature operation by the temperature controlled air is described.

The temperature controlled air (cooling air, warm air) blown out from the air blowout port 35a of the temperature control unit 3 flows toward the rear of the vehicle from the front of the vehicle through the air distribution duct 9. Then, from the blowout opening 91 of the air distribution duct 9, as shown by arrow B in FIG. 6, the temperature controlled air is blown out in a wide range of vehicle width direction along the stack front upper region 21a of the first battery module 21. Thus, heat exchange takes place between the temperature controlled air blown out from the blowout opening 91 of the air distribution duct 9 and the first battery stack 21.

Then, as indicated by arrows C, C in FIG. 6, the temperature controlled air that has exchanged heat with the battery stack 21 is bifurcated into both sides of the vehicle width direction and flows into the recirculation passage 38. As indicated by arrows D, D in FIG. 6, the temperature controlled air that has flowed in the recirculation passage 38 flows through the vehicle side passages toward the front of the vehicle from the rear of the vehicle, respectively. Of the temperature controlled air toward the vehicle front from the rear of the vehicle, as indicated by arrows E, F and G in FIG. 6, a part of the temperature controlled air flows towards the central passage 36 through the cross passage 37 and a clearance between the second battery stack 22 and the third battery stack 23 to merge into the central passage 36. Therefore, heat exchange takes place between the temperature controlled air flowing towards the central passage 36 and the first and second battery stacks 22, 23.

The temperature controlled air, having exchanged heat with the first battery stack 21, through the vehicle side passage of the recirculation passage 38 toward the front of the vehicle from the rear of the vehicle, will be returned to the intake side of the temperature control unit 3 via the vehicle front passage of the recirculation passage 38. In addition, after exchanging heat with the first battery stack 21, the temperature controlled air that merges into the central passage 36 and flows from the vehicle rear to the vehicle front will be merged at the vehicle front side passage and returned to the intake side of the temperature control unit 3. Therefore, when the temperature controlled air is returned to the intake side of the temperature control unit 3, the returned temperature controlled air is introduced in the temperature control unit 3 for producing cooling air or warm air again and the temperature control process will be repeated.

As described above, such a configuration is adopted in which the warm air from the temperature control unit 3 pass through from the air distribution port 35a in the air distribution duct 9 and is blown out from the blowout opening 91 with respect to the stack front surface upper region 21a of the first battery stack 21 toward the rear of the vehicle.

For example, during travel or running of the vehicle, when monitoring the battery stack whose temperature has increased, with respect to the cooling effect by the running wind, cooling of the front side of the vehicle battery stack is large whereas cooling of the rear side of the vehicle battery stack is small. Therefore, when observing the temperature distribution of the battery stack in the case, such a temperature distribution is shown in which the temperature of the vehicle rear side battery stack is higher than the vehicle front side battery stack. When the cooling air is blown out to the vehicle front side battery stack in this temperature distribution condition, cooling air will be delayed to reach the vehicle rear side battery stack so that the vehicle rear side battery stack remains at high temperature. Thus, the temperature distribution state with a great temperature drop will be maintained for a long period of time.

In contrast, when blowing cooling air to the first battery stack 21 first, a cooling operation will be such that the temperature of the first battery stack 21 will be reduced with good response, and subsequently the atmosphere temperature in the internal space of the battery pack case decreases to cool the second and third battery stacks 22,23. Thus, the temperature drop across the first battery pack 21 and the second and third No. 1 and the battery packs 22, 23 will be suppressed in a short time so that the temperature equalization among each of the battery stacks 21, 22, and 23 will be achieved effectively.

Prevention Operation of Electrode Short Circuit Due to Condensed Water

As described above, when producing a cooling air by introducing into the evaporator 32 refrigerant of the air conditioner unit 107, condensed water or condensate is generated in the (core portion of) heat exchanger of the evaporator 32 by the difference between the refrigerant temperature and the ambient temperature. When this condensed water is generated, it is required to avoid the condensed water from reaching a battery electrode disposed in the downstream direction. Below, description is given of the operation on the prevention of short circuit of the electrode due to the condensed water reflecting this consideration.

When laying out the battery pack under the floor, considering that travelling in a flooding road or after a preceding vehicle may cause splash water, mud, or dust to intrude into the internal battery pack, which can affect the electrical equipment, the battery pack case has a watertight structure. When the battery pack case is formed in a watertight structure, if an evaporator is accommodated in the case, compared to a non-water tight (open structure) battery pack, the amount of condensed water generated by the evaporator core will be reduced. However, the condensed water may not be actively discharged outside using a drain pipe or the like.

Therefore, in the first embodiment, in order for the condensed water generated by the evaporator 32 to reach the electrode in the battery stack 2, such a structure is adopted in which an air heating type PTC heater 34 with mesh fins 34c is installed in the downstream of the blower fan 33.

Thus, in addition to the effect that foreign object such as water, mud, etc. will not enter the battery pack case 1 due to the water tight structure, it is possible to reduce the amount of water generated by the evaporator 32. Also, when the condensed water is generated by the evaporator 32, due to the provision of blower fan 33 and the mesh fins 34c in a downstream position of the evaporator 32, the condensed water of fine particulate sent from the evaporator 32 will be adhered to the blower fan 33 and the mesh fins 34c for evaporation and blocking. Moreover, because of provision of the blower fan 33 and the mesh fins 34c along with the unit duct 35 downstream of the evaporator 32, the distance from the evaporator 32 to the battery electrode will be maintained, it will be difficult for the condensed water to reach the electrode of the battery stack 2.

In other words, in addition to the condensed water reducing operation to reduce the condensed water generated by the evaporator 32, by way of the condensed water blocking operation and the delaying operation of condensed water to adhere the electrode, the condensed water is unable to reach the battery stack 2 disposed in a downstream position of the mesh fins 34c.

Consequently, the condensed water generated by the evaporator 32 of the temperature control unit 3 is prevented from reaching the electrode of the battery stack 2.

Also, the blower fan 33 is disposed between the evaporator 32 and the PTC heater 34 with mesh fins 34c. Therefore, when condensed water occurs on the evaporator 32, the condensed water is partly evaporated by adhering to the blower fan 33 first so that remaining water reaches the mesh fins 34c to be evaporated. Thus, a combination of the blower fan 33 and the mesh fins 34c double blocks (adhering and evaporation) the condensed water.

Further, by disposing the evaporator 32, the blower fan 33, and mesh fins 34*c* (unit duct 35) in this order, a substantial distance can be between the evaporator 32 and the battery stack 2 (electrode). Therefore, compared to a structure with a short distance between the evaporator and the battery stack, condensed water is unlikely to reach the electrode of the battery stack 2. In particular, since the unit duct 35 is connected with the air distribution duct 9 that extends the blowout opening 91 to the first battery stack disposed in the rearward of the vehicle, a sufficient distance between the evaporator 32 and the battery stack 2 can be secured.

In the first embodiment, such a configuration is adopted in which a PTC heater has mesh fins 34 *c* as fin member 34*c*. Thus, the air heating PTC heater 34 also function to splash prevention effect of the condense water, it is not necessary to provide mesh fins separately to achieve a costly effective solution. Also, due to heating by the PTC heater 34, the condensed water will evaporate.

Now, the effects are described. In the battery temperature control device in the first embodiment, it is possible to attain the following effects listed below:

(1) A battery temperature control device, comprising:
a battery module (battery stack 2);
a temperature control unit 3 that is configured to adjust a temperature of the battery module (battery stack 2);
a battery pack case 21 housing the battery module (battery stack 2) and the temperature control unit 3, wherein the temperature control unit 3 includes, disposed from the upstream side of the air flow, an evaporator 32 that exchanges heat using a refrigerant of a vehicle cabin air conditioner (air conditioning unit 107), a blower (blower fan 33) that recirculate a battery case interior air, a fin member (PTC heater 34), and a duct (unit duct 35) supplying air to the battery module (battery stack 2) (FIG. 7). Therefore, condensed water generated by the evaporator 32 of the temperature control unit 32 is prevented from reaching an electrode of the battery module (battery pack 2).

(2) The fin member is a PTC heater 34 including mesh fins 34*c* (FIG. 8). Therefore, in addition to the effect of (1) above, it is not necessary to provide a fin member separately so that a cost effective structure can be attained. Also, the condensed water will evaporate by heating of the PTC heater 34.

(3) The battery pack case 1 is disposed in a position under the floor of the vehicle (FIGS. 1, 2).

Therefore, in addition to the effects of (1) and (2), by laying out the battery pack BP under the floor, a wide passenger space and luggage room can be formed so that passenger comfort and convenience can be improved.

(4) The blower is structured in a water-tight structured blower fan 33 (FIG. 7).

Therefore, in addition to the effects of (1) to (3), when condensate is sucked, because of separation of the blower motor from water, the blower fan 33 is prevented from breaking down.

(5) The evaporator 32 is disposed such that one core surface 32*a* thereof is placed in parallel and generally opposed to a pack case inner side surface (frame inner side surface 11*a*). Further, the blower (blower fan 33) is disposed such that a suction side 33*a* thereof is placed in parallel and generally opposed to the other core surface 32*b* of the evaporator 32 (FIG. 7).

Therefore, in addition to the effects of (1) to (4), it is possible to shorten the lengthwise dimension necessary for mounting the evaporator 32 and the blower (blower fan 33) so that the temperature control unit 3 can be compact.

(6) The battery pack case 1 is disposed under the floor of the vehicle in the middle of the vehicle longitudinal direction; while the temperature control unit 3 is arranged in a position on the side adjacent an air conditioner compressor 103 disposed in a motor room 101 forward of the vehicle (FIG. 6)

Therefore, in addition to the effect of (3), since the piping length for guiding the air conditioning refrigerant is shorter, the cost and weight of the piping can be reduced. In addition, since the pressure loss of the refrigerant by the length of the piping can be reduced, it is possible to efficiently cool the evaporator 32

(7) The evaporator is placed in a vehicle position more forward than the blower (blower fan 33) (FIG. 7).

Therefore, in addition to the effect of (6), the piping length from the core portion of the evaporator 32 to the refrigerant connector terminal 13 for removing out of the battery pack BP can be shortened.

Therefore, the temperature control unit 3 in the battery pack BP can be made compact and the temperature controlled air will be prevented from being disturbed by piping.

The battery temperature control device according to the present invention has been described above with reference to the first embodiment. However, the specific configurations are not limited to the first embodiment. Without departing from the guts of the invention pertaining to each claim in CLAIMS, design changes or addition can be allowable.

In the first embodiment, an example is shown in which the battery pack BP is placed under the floor of the vehicle. However, the battery pack can be place in a luggage room of the vehicle or the like.

In the first embodiment, an example is shown, in which a plurality of battery modules are stacked to be a battery stack 2 (group of battery modules). However, such as battery module is included without the plurality of modules being stacked on one another.

In the first embodiment, an example is shown in which, as the fin member, a PTC heater 34 with mesh fins 34*c* is used. However, as the fin member, a structure that only possesses a fin function to block (adhering & evaporating) condensed water. Also, the fin shape is not limited to a mesh. As long as the shape ensure to block (adhering and evaporating) condense water, it can be shaped in a honeycomb or corrugated structure.

In the first embodiment, the temperature control unit 3 is shown that produces both cooling air and warm air. However, the temperature control unit can be formed in a unit that includes an evaporator to produce cooling air only. In this case, a fin member which has only a fin function is used.

In the first embodiment, an example is shown in which the temperature control unit 3 and the air distribution duct 9 are placed in the interior space of the battery pack case 1. However, another example can be conceivable in which only the temperature control unit can be placed within the interior of the battery pack case, and air is distributed from the unit duct to the battery stack via the clearance of the battery stack.

In the first embodiment, an example is shown in which the battery temperature control device according to the present invention is applied to an electric vehicle that is mounted with a driving motor as a driving power source. However, the battery temperature control device according to the present invention can be applicable to a hybrid vehicle that has a driving motor and an engine mounted as a propulsion source.

The invention claimed is:

1. A battery temperature control device, comprising:
a battery module;
a temperature control unit configured to adjust a temperature of the battery module; and
a battery pack case housing the battery module and the temperature control unit, the temperature control unit including an evaporator configured to exchange heat using refrigerant from a cabin air conditioner of a vehicle and being disposed on an upstream side of air flow of the temperature control unit, a blower configured to recirculate battery case interior air, a fin member, and a duct configured to supply air to the battery module, the fin member being disposed downstream of the evaporator and the blower and disposed upstream of the battery module;
the battery pack case being configured to be arranged under a floor of the vehicle in a middle of a vehicle longitudinal direction, the temperature control unit being configured to be arranged in a position on a side adjacent an air conditioner compressor disposed in a motor room in a forward portion of the vehicle and the evaporator being configured to be disposed in a vehicle position more forward than the blower.

2. The battery temperature control device as claimed in claim 1, wherein
the fin member is a Positive Temperature Coefficient (PTC) heater including mesh fins.

3. The battery temperature control device as claimed in claim 1, wherein
the blower is a blower fan having a water-tight structure.

4. The battery temperature control device as claimed in claim 1, wherein
the evaporator is disposed such that a first core surface thereof is disposed in parallel and substantially opposed to an inner side surface of the battery pack case, and the blower is disposed such that a suction side thereof is in parallel and substantially opposed to a second core surface of the evaporator.

* * * * *